United States Patent [19]
Okada et al.

[11] 3,888,738
[45] June 10, 1975

[54] METHOD FOR PURIFYING CYCLODEXTRIN-PRODUCING ENZYMES

[75] Inventors: Shigetaka Okada, Nara; Sumio Kitahata, Osaka, both of Japan

[73] Assignee: Hayashibara Kabushiki-Kaisha, Okayama, Japan

[22] Filed: Oct. 31, 1973

[21] Appl. No.: 411,218

[52] U.S. Cl. ............................................. 195/66 R
[51] Int. Cl. .............................................. C07g 7/02
[58] Field of Search ........................ 195/66 R, 31 R

[56] References Cited
UNITED STATES PATENTS

| | | |
|---|---|---|
| 3,297,480 | 1/1967 | Matsuda et al. .............. 195/66 R X |
| 3,640,847 | 2/1972 | Armbruster et al. .............. 195/31 R |
| 3,812,011 | 5/1974 | Okada et al. ..................... 195/31 R |

OTHER PUBLICATIONS

Norberg et al., JACS, Vol. 72, p. 1202–1205, (1950).

*Primary Examiner*—Lionel M. Shapiro
*Attorney, Agent, or Firm*—Browdy and Neimark

[57] ABSTRACT

A method for purifying cyclodextrin-producing enzymes, which is characterized in purifying the enzymes by adsorption on starch and/or cyclodextrins.

4 Claims, No Drawings

METHOD FOR PURIFYING CYCLODEXTRIN-PRODUCING ENZYMES

The present invention relates to a method for purifying cyclodextrin-producing enzymes, which is characterized in adsorbing the enzymes on starch. Cyclodextrin-producing enzyme (also designated as alpha-1,4 glucan 4-glycosyltransferase or cyclizing enzyme and classified as EC 2.4.19) is usually referred to as *Bacillus macerans* amylase. The enzyme is long known as an enzyme which produces cyclodextrins (also called schardinger dextrins). However, since the uses for the dextrins were undeveloped so far, only a few enzymological studies and investigations, with the objective to discover purification methods applicable on an industrial scale, were carried out. The only available report so far is by J. A. De Pinto and L. L. Campbell, in which are illustrated the ion exchange and chromatographic methods carried out on laboratory scales; Biochemistry 7, 114, (1968). Cyclodextrin-producing enzymes were originally regarded as a variety of amylases based on its action on starch. However, the catalysis is primarily a transfer reaction on oligosaccharides as illustrated in Table 1. The enzymes are entirely different to hydrolases, such as amylases, and are enzymes which are classified as transferases. Accordingly, their activity determination is impossible by the method usually used for determining the activities of polysaccharide-hydrolyzing enzymes, which were determined by assaying the amount of reducing sugars formed by the hydrolysis. The fact attributes to the difficulty rendered in the development of said enzymes.

Perceiving the many potential utilities of the enzyme, the present inventors performed extensive studies with the objectives to discover other enzymes with similar actions in the natural world to develop methods to purify said enzymes. The studies resulted in the discovery that an enzyme with similar action is elaborated by strains of genera *Bacillus megaterium*, details of which will be described later. These enzymes elaborated by *Bacillus macerans* and *Bacillus megaterium* function entirely differently to the commonly known amylases. The inventors found that when a mixture prepared by adding to a solution of such enzyme a given amount of ammonium sulphate or an organic solvent, or, alternatively, an enzyme-ammonium sulphate or organic solvent system is subjected to passage through a layer comprising starch and/or cyclodextrin, the starch and/or cyclodextrin will adsorb selectively the enzyme. In addition, they found that one gram starch could adsorb about 10 mg of the enzyme and that when the optimal elution conditions are chosen an enzyme with a very high purity is recoverable nearly at the theoretical yield. Also the purification method according to the invention can be scaled up to a commercial stage much more easily than the conventional method wherein ion exchangers are used for the purification. Therefore the invention is an advantageous and preferable purification method which is feasible for commercial production.

As described above, *Bacillus macerans* was regarded so far as the sole source of cyclodextrin-producing enzyme. However the inventors' studies led to the finding that some strains of *Bacillus megaterium* elaborates such enzyme. More particularly, although the enzyme derived from *Bacillus megaterium* var. T 5 (ATCC 21737, FARM-P 935) produces cyclodextrins, the cyclodextrins produced therewith are different to those obtained with *Bacillus macerans*, as well as the two enzymes are different in their enzymatic stabilities and isoelectric points. (See Table II)

Table II

| | Properties of cyclodextrin-producing enzymes | | |
|---|---|---|---|
| Microorganism | B. macerans ATCC 8514 | B. macerans IFO 3490 | B. megaterium Var. T 5 |
| Action on starch | Produces primarily cyclohexadextrin | Produces primarily cyclohexadextrin | Produces primarily cycloheptadextrin |
| Activity assay by the Tilden & Hudson method | Determinable | Determinable | Undeterminable |
| Optimum pH | 5.5 | 5.5 | 5.5 |
| pH stability | — | 6.5–9.0 | 6.5–9.0 |
| Thermal stability | — | 62°C | 55°C |
| Optimum temperature | — | 55°C | 55°C |
| Method of purification | Ion exchange | Adsorption on starch | Adsorption on starch |
| Isoelectric point | | 4.62 | Two points; 6.07 and 6.80 |

The inventors, however, discovered that the *Bacillus megaterium* var. T 5 enzyme can be purified similarly as the *Bacillus macerans* enzyme by starch adsorption. Particularly, the inventors found that the purification method as disclosed in the specification is applicable for any transferase which produces cyclodextrins.

As regards the employable starches in the invention, cereal starches, such as those derived from corn maize and rice, are more preferable than tuber starches because they adsorb more enzyme. However, tuber starches may be used in the invention. Also roasted starches obtained by preheating starch are preferable since they raise enzyme adsorption capacities. In addition to the above starches, cyclodextrins obtained by hydrolysis of starch with cyclodextrin-producing enzyme may be used as adsorbent. However, among the cyclodextrins, cycloheptadextrin is more preferable than cyclohexadextrin since the former has a lower Table I

| Function mechanism of cyclodextrin-producing enzymes. |
|---|
| Cyclization: Starch → Cyclodextrins |
| Coupling: Cyclodextrins + Glucose → Oligosaccharides terminated at the reducing end by the added glucose |
| Homologizing: (Oligosaccharides)$_n$ + (Oligosaccharides)$_m$ → Various oligosaccharides | water solubility which leads to the easiness rendered in the subsequent procedures such as required for the separation and elution of the enzyme.

During adsorption it is preferable to maintain the pH in the range of 5.0–9.0, and the solution temperature not higher than 10°C, preferably in the range of 0°–5°C. An addition of ammonium sulphate, alcohol or acetone in an amount that is sufficient to reduce slightly the protein content in the solution is effective. The relationship between the concentration and adsorption efficiency of ammonium sulphate will be described in Experiment 1. Namely an ammonium sulphate concentration of 30 percent saturation or lower is preferable. A much higher concentration will salt-out the enzyme, whereas the enzyme will not adsorb on the starch if the concentration is too low; each case will result in a lower adsorption amount of enzyme on starch.

In case one member of a group consisting of ethyl alcohol, acetone and isopropylalcohol is used instead of ammonium sulphate, a concentration of about 30 v/v% gives the highest result for each solvent. As an addition of an about 30 percent saturated ammonium sulphate or 30 v/v% of organic solvent to crude enzymatic solution will effect a white turbidity of the impure protein co-existing in the solution, the enzyme in a high purity can be obtained effectively by carrying out the adsorption procedure after removing the precipitate by filtration or centrifuge.

The enzyme is adsorbed by dissolving a sufficient amount of ammonium sulphate or organic solvent in a cooled culture broth filtrate, adding to the resulting solution the adsorbent starch and then allowing the mixture to stand for a given time. Usually the mixture is allowed to stand for over ten minutes. It was confirmed that most of the enzyme is adsorbed on the starch by separating the starch portion and supernatant of the solution which was allowed to stand. Alternatively, the enzyme is adsorbed more effectively if the culture broth filtrate is allowed passage through a column prepared with starch and a filter-aid, such as belonesite. In industrial practice of the later procedure the employment of a cooled column over 10 cm tall will give a more satisfactory result than in a laboratory.

The starch on which the enzyme is adsorbed is washed once with a cooled aqueous ammonium sulphate solution or an aqueous organic solvent solution with the same concentration respectively, suspended in a M/30 $Na_2HPO_4$ solution and then the resultant was allowed to stand for 1 hour at 30°C. When the suspension is filtered the filtrate will be an eluted enzymatic solution. As will be described in the Examples highly satisfactory results were attained when the purification method according to the present invention was applied to enzymes of *Bacillus macerans* and *Bacillus megaterium*.

Although these enzymes have different isoelectric points, each of them are adsorbable on starch and the present invention is applicable to them regardless of their origins. Therefore any enzyme that produces cyclodextrins can be purified by applying the present method.

Experiment 1.

On a culture medium containing corn steep liquor as its major component was inoculated strains of *Bacillus macerans* IFO 3490 and the mixture was incubated at 37°C under stirring conditions for 60 hours. A crude enzymatic solution was obtained after removal of the cells by centrifuge. In fifty ml aliquots of the solution was dissolved sufficient amounts of ammonium sulphate to give 10, 20, 25, 30 and 40 percent concentration against saturation. During the procedure the aliquots were maintained at 3°C. After adding thereto 0.5 gr of belonesite, the aliquots were filtered with suction and one ml of the resultant transparent solution was collected and assayed for enzyme activity, designating the value A. A mixture prepared by adding to the filtrate 2 gr starch and 1 gr belonesite was filtered with suction after maintaining the mixture at 3°C for 10 minutes. The enzymatic activity determined on a one ml aliquot of the resultant filtrate was designated as B. The enzymatic activities indicated throughout the specification were determined by the following method.

After incubation of a mixture comprising 4.5 ml of a 0.55 percent soluble starch solution, bufferized to pH 5.5, and 0.5 ml of the enzyme solution at 40°C for 10 minutes, 0.5 ml fraction thereof was added 4 ml of a 0.01M $I_2$-KI solution, and then water to give a total volume of 20 ml. The transmittance of the mixture solution at 660 m$\mu$ was measured with a spectrometer. The enzymatic activity which effect a 10 percent increase of transmittance at 660 m$\mu$ by the incubation was expressed as ten units. The activity determination method is the same as the one used for determining alpha-amylase activity. Since it was confirmed that alpha-amylase is substantially absent in crude enzymatic solutions of *Bacillus macerans* and *Bacillus megaterium*, there is no fear that the values obtained will be affected by the coexistence of alpha-amylase. Therefore the method is feasible for determining the activity of cyclodextrin-producing enzymes.

The results of the Experiment are listed in Table III.

Table III

The ammonium sulphate concentration for starch adsorption of the enzyme.

| Ammonium sulphate, (%) saturation | 0 | 10 | 20 | 25 | 30 | 40 |
|---|---|---|---|---|---|---|
| A (%) | 100 | 100 | 95 | 96 | 80 | 30 |
| B (%) | 85 | 80 | 70 | 44 | 5 | 2 |
| A minus B (%) | 15 | 20 | 25 | 52 | 75 | 28 |

As the above table shows, if the concentration exceeds 30 percent saturation the enzyme is salted out resulting in a lower A value, whereas if it is less than 20 percent saturation the enzyme will not adsorb on the starch giving a higher B value. In each case the A minus B value (the amount of enzyme adsorbed on starch) will decline. Therefore to effect starch adsorption of enzyme it is most preferable to adjust the ammonium sulphate concentration in the range from about 25 to about 30 percent saturation.

The invention will be illustrated further in reference to the following examples.

EXAMPLE 1

Eighty ml aliquots of a culture medium containing 1 w/v% corn steep liquor, 1 w/v% starch, 0.5 w/v% ammonium sulphate and 0.5 w/v% $CaCO_3$ were transferred into 500 ml Sakaguchi flasks. After sterilization the aliquots were inoculated with strain of *Bacillus macerans* IFO 3490, and the mixtures were incubated at 37°C for three days under stirring conditions. The culture broth usually shows an activity of about 19 units per ml. Two and a half liters of a transparent culture broth was obtained by centrifugal separation. After adding to the culture broth which was cooled to 3°C a sufficient amount of ammonium sulphate to bring the mixture to a 30 percent saturated ammonium sulphate mixture solution, the slightly formed turbidity is removed from the resultant by filtration with suction using a small amount of belonesite. A suspension obtained by adding 30 gr of corn starch to the thus obtained transparent culture broth filtrate is cooled to 3°C and then allowed to stand for a period exceeding ten minutes. Separately, a starch layer is prepared by suspending 70 gr corn starch and 50 gr belonesite in a 30 percent saturated aqueous ammonium sulphate solution and filtering the suspension with suction. When the suspended enzyme solution is allowed passage through the starch layer, not more than 10 percent of the original activity will remain in the solution which passes the layer.

After washing the starch-belonesite layer with a 30 percent saturated aqueous ammonium sulphate solution, the resultant is suspended in a M/30 $Na_2HPO_4$ solution of an amount of three times of the amount of the resultant at 30°C for 1 hour. About 25 percent of the original activity was found present in the solution filtered with suction. Two successive runs of elution with an aqueous M/30 $Na_2HPO_4$ solution will result in a recovery of about 75 percent of the enzymatic activity. The precipitates formed by increasing the ammonium sulphate saturation from 25 to 45 percent were recovered. Thus the enzymatic activity could be increased about 30 times per N mg in comparison to that of the culture broth.

EXAMPLE 2

Sixty ml aliquots of a culture medium containing 1 w/v% solid wheat bran, 1 w/v% corn steep liquor, 0.5 w/v% dry yeast, 1.0 w/v% polypeptone, 0.25 w/v% ammonium sulphate, 4 w/v% soluble starch, 0.1 w/v% urea and 1.0 w/v% $CaCO_3$ were transferred into 500 ml Sakaguchi flasks. After sterilization the aliquots were inoculated with strains of *Bacillus megaterium* T-5 (ATCC 21737, FARM-P 935) and incubated at 37°C for 60 hours with agitation. The culture broth showed an enzymatic activity of 40 units per ml. The transparent culture broth filtrate obtained by centrifuge was cooled to 3°C and was added chilled acetone of an amount of half of that of the culture broth. The slightly formed whitish turbidity was removed by centrifuge. Thereafter a suspension was prepared with the culture broth which was cooled to 3°C and corn starch and passed through a corn starch and belonesite mixture layer similarly as described in the preceding example. About 10 percent of the original activity was found present in the filtered solution.

After washing the starch-belonesite layer with a chilled 30% aqueous acetone solution, the absorbed enzyme was eluted in a M/30 $Na_2HPO_4$ solution. The precipitates formed by increasing the ammonium sulphate saturation of the elution from 25 to 45 percent were recovered. Thus the enzymatic activity could be increased about 60 times per N mg in comparison to that of the culture broth. The yield was 65 percent.

EXAMPLE 3

The procedures described in Example 1 were carried out with the exception that crude cyclodextrins were used in place of corn starch as absorbent. In this Example an enzyme with a purity of about 15 times higher than that of the initial culture broth per N mg was attained. The yield was about 60 percent.

What is claimed is:

1. A method for purifying alpha-1,4-glucan 4-glycosyltransferase, comprising adsorbing the enzyme on cyclodextrin, desorbing and recovering the enzyme.

2. A method in accordance with claim 1, wherein ammonium sulphate and/or hydrophilic organic solvent is or are added to the crude enzymatic solution which is to be purified with the purpose to expedite the selective adsorption of enzyme.

3. A method in accordance with claim 1 wherein said cyclodextrin on which the enzyme is adsorbed is cycloheptadextrin.

4. A method in accordance with claim 1, wherein ammonium sulfate is added to the crude enzymatic solution in an amount from about 25 to about 30 percent concentration against saturation to expedite the selective adsorption of enzyme.

* * * * *